United States Patent

Landes et al.

[11] Patent Number: 5,978,729
[45] Date of Patent: Nov. 2, 1999

[54] ELECTRONIC ENGINE CONTROL AND METHOD OF OPERATING SAME

[75] Inventors: James W. Landes, East Peoria; Mark E. Rettig, Peoria, both of Ill.

[73] Assignee: Caterpillar Inc., Peoria, Ill.

[21] Appl. No.: 08/950,576

[22] Filed: Oct. 15, 1997

[51] Int. Cl.$^6$ .................................................. B60K 31/00
[52] U.S. Cl. ........................ 701/115; 701/101; 123/352
[58] Field of Search ................... 701/115, 110, 701/102; 123/350, 351, 352

[56] References Cited

U.S. PATENT DOCUMENTS

| | | | |
|---|---|---|---|
| 3,878,915 | 4/1975 | Purland et al. ...................... | 180/105 E |
| 4,099,592 | 7/1978 | Gonzales ................................. | 180/108 |
| 4,252,096 | 2/1981 | Kennedy ................................. | 123/370 |
| 4,472,777 | 9/1984 | Youngblood ........................... | 364/426 |
| 4,479,184 | 10/1984 | Nakano .................................. | 701/110 |
| 4,853,720 | 8/1989 | Onari et al. ........................ | 364/431.07 |
| 4,887,684 | 12/1989 | King ......................................... | 180/179 |
| 5,043,647 | 8/1991 | Flaig et al. .............................. | 123/352 |
| 5,079,710 | 1/1992 | Brauninger et al. .............. | 364/431.07 |
| 5,243,523 | 9/1993 | Stepper et al. ......................... | 701/110 |
| 5,477,827 | 12/1995 | Weisman et al. ..................... | 123/436 |
| 5,508,925 | 4/1996 | Katayama et al. .................... | 123/352 |
| 5,521,823 | 5/1996 | Akita et al. ......................... | 364/424.05 |
| 5,581,465 | 12/1996 | Adler et al. ............................ | 701/110 |
| 5,665,026 | 9/1997 | Linden .................................... | 477/108 |
| 5,774,820 | 6/1998 | Linden et al. ......................... | 701/110 |

*Primary Examiner*—Willis R. Wolfe
*Assistant Examiner*—Hieu T. Vo
*Attorney, Agent, or Firm*—R. Carl Wilbur

[57] ABSTRACT

An electronic control for a compression ignition engine preferably includes engine sensors and vehicle sensors connected to the control. The control inputs signals produced by the sensor and responsively calculates a plurality of rating factors. The control weights the rating factors according to owner programmed weighting and also calculates a driver performance factor as the sum of the weighted rating factors. A modified vehicle speed limit is calculated in response to the driver performance score exceeding a minimum incentive value.

6 Claims, 6 Drawing Sheets

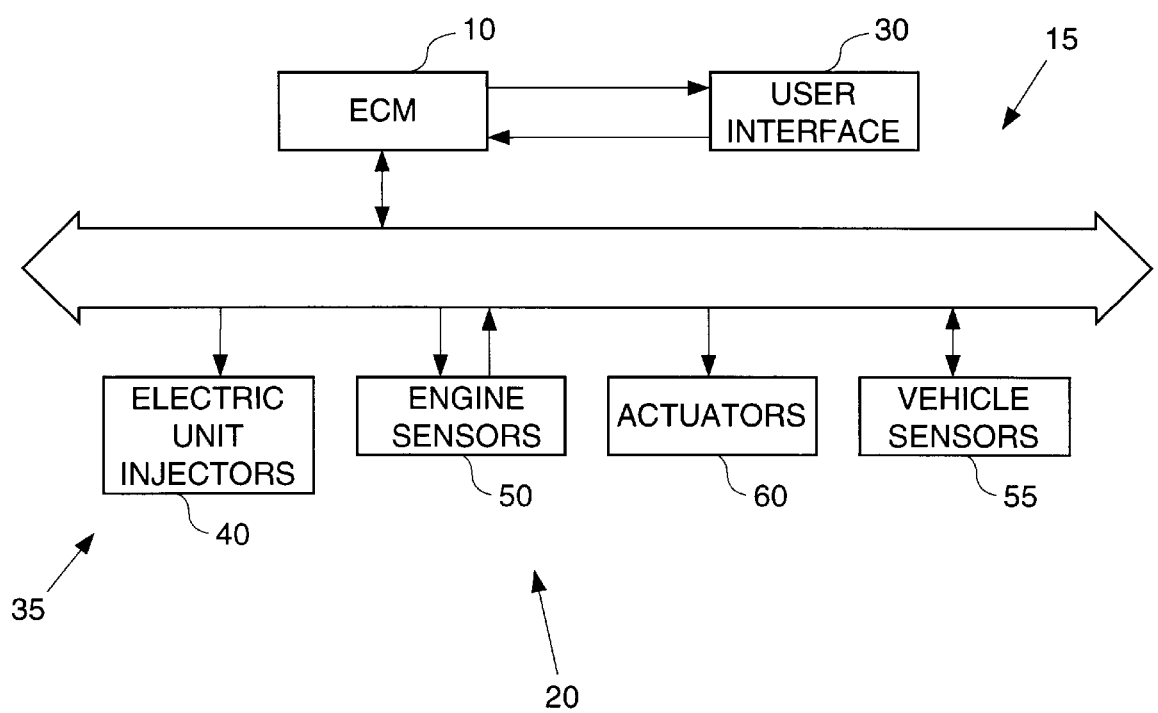

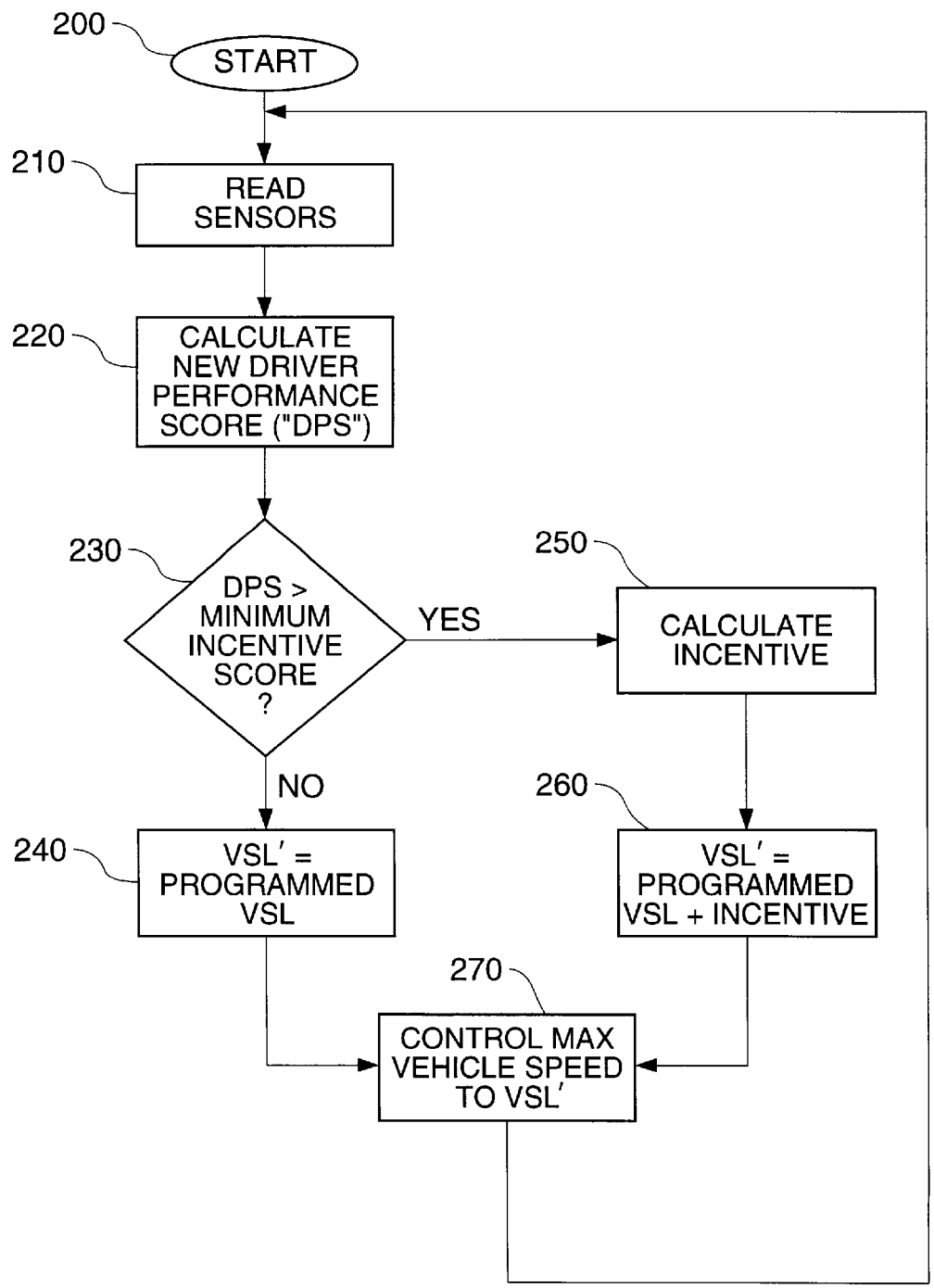
Fig_2_

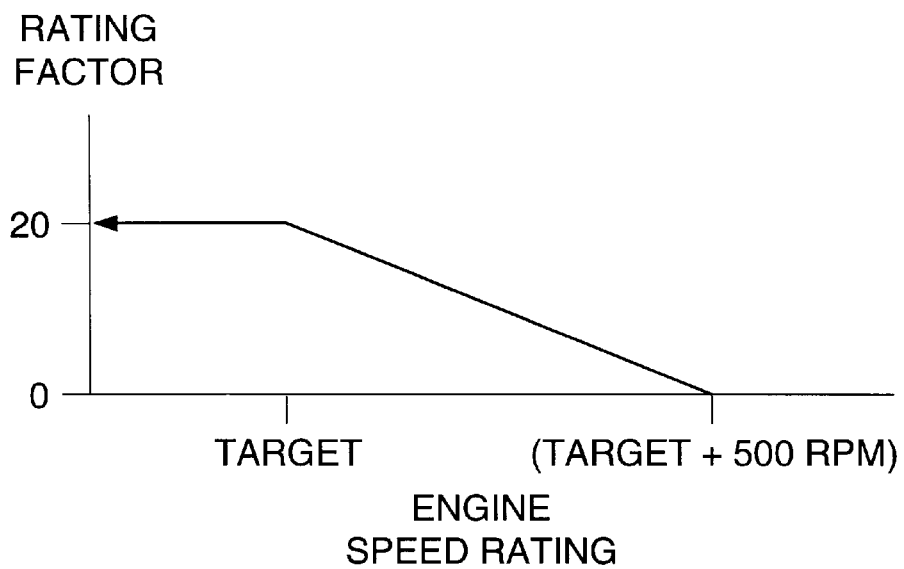
Fig_3a_
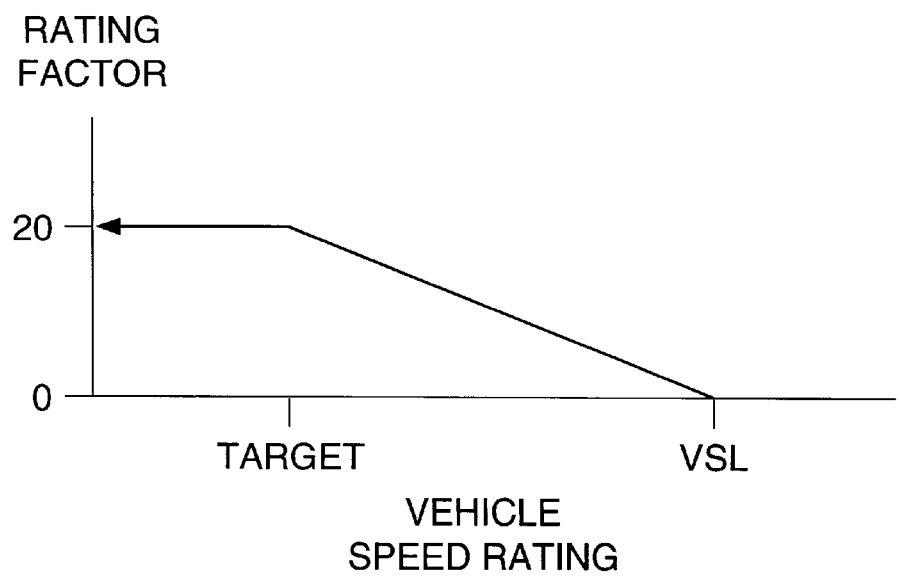
Fig_3b_

Fig_3c_
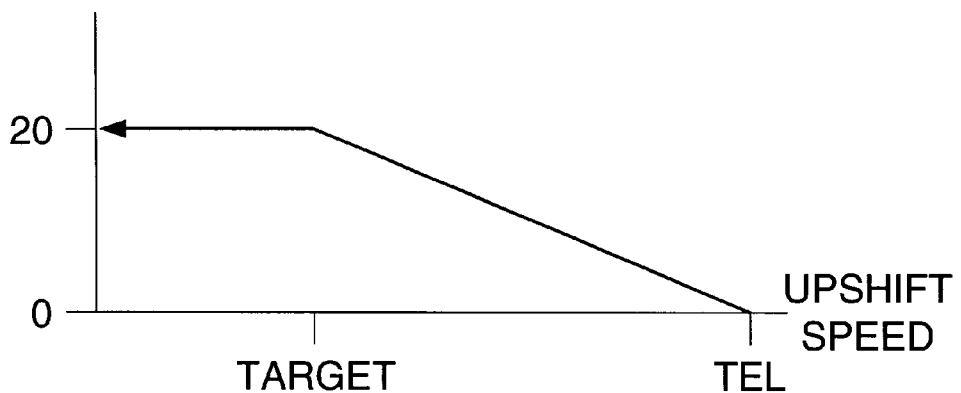
SHIFTING TECHNIQUES RATING
Fig_3d_
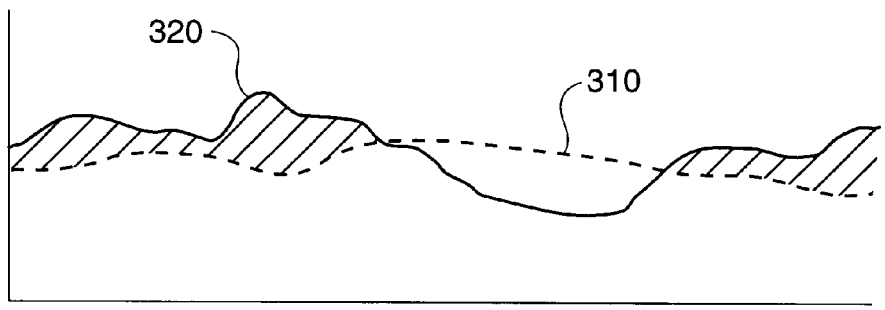
LOAD DEMAND INTEGRATION

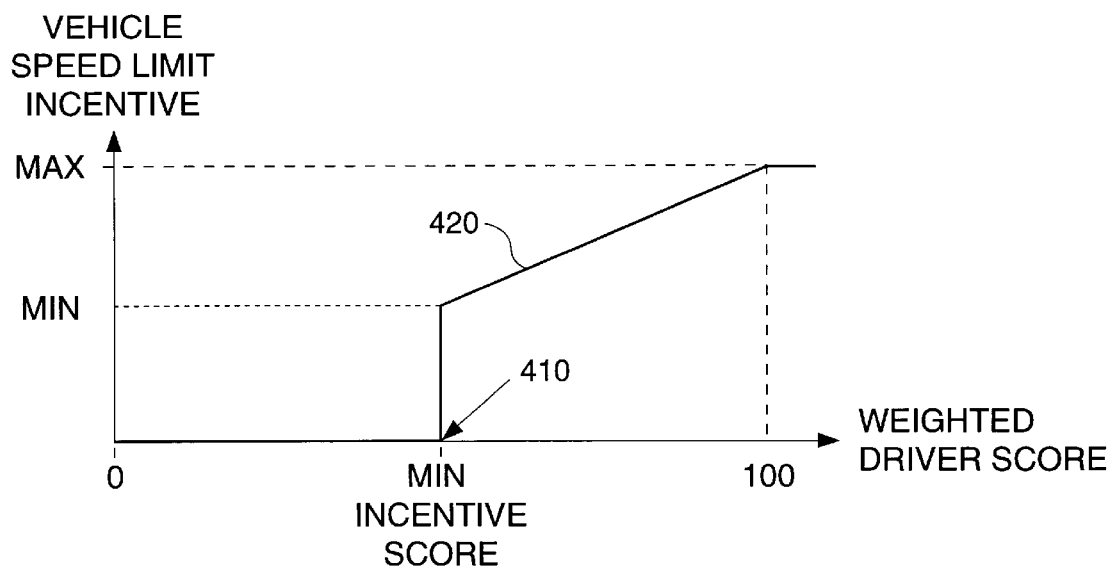

ELECTRONIC ENGINE CONTROL AND METHOD OF OPERATING SAME

TECHNICAL FIELD

The present invention relates generally to the field of compression ignition engine controls, and more particularly, to electronic compression ignition engine controls for use with on-highway vehicles.

BACKGROUND ART

Electronic controls for compression ignition engines are known in the art. Some of those known electronic controls have provided more flexibility and greater control over engine performance and emissions than do mechanical controls. For example, when used in connection with an on-highway truck, some electronic controls provide the capability to program a maximum vehicle speed limit. Maximum vehicle speed typically could only be limited in mechanically controlled engines by matching the maximum engine speed with a specific transmission and differential ratio. Although this mechanical method prevented operators from running faster than the desired speed it did not always permit the engine to run most efficiently.

Electronic controls, however, permit an owner to program a maximum vehicle speed which is then used by the controller to limit power output when the vehicle is traveling faster than that speed. For example, if the maximum vehicle speed is programmed to be 55 MPH, then the electronic control will limit engine power when the vehicle speed exceeds the programmed 55 MPH limit. One such electronic control that incorporates this vehicle speed limiting strategy is the ADEM II controller, readily available on a variety of compression ignition engines from Caterpillar Inc., the assignee of the present patent.

Vehicle speed limiting generally provides improved fuel economy at the expense of reduced speeds and increased trip times. Although the feature is generally favored by fleet owners who want to increase their profits by slowing their drivers down and thereby decreasing the overall operating cost of the vehicle, the feature is sometimes considered an annoyance by drivers who are generally paid by the mile and, therefore, like to increase speed and thereby decrease trip time.

Variations of the vehicle speed limiting feature have been developed to appease both groups. One such variation Is described in U.S. Pat. No. 5,477,827. In that patent a variable vehicle speed limit is described in which the vehicle speed limit may be increased by a fuel economy speed limit adder if the vehicle operator achieves a programmed filtered fuel economy. The philosophy of that device is to provide an incentive for the vehicle operator to maximize fuel economy.

Although the device disclosed in U.S. Pat. No. 5,477,827, might promote fuel efficient driving in some circumstances, it does not work in all driving conditions and does not necessarily promote the most cost effective overall vehicle operation in all instances. For example, there is no way for that control to promote vehicle operation that reduces maintenance costs, another important cost component for fleet managers and owners, which are associated with "hard" driving (i.e., the practice of abruptly controlling the throttle and brake, among other things). Additionally, a driver who drives a city route may not be able to achieve the preprogrammed fuel economy level, not because he is driving inefficiently, but instead because there are many unforeseen signal lights and stop signs which prevent him from achieving the same fuel economy as a vehicle driven on the highway. In those instances a pre-programmed fuel economy level may not promote efficient driving. Also, the device of the '827 patent cannot determine how severely the operator runs the engine and thus cannot account for undue stress the operator may place on the engine, driveline or other engine or vehicle components.

It would be preferable to have a system that promotes efficient overall driving techniques to reduce the overall cost of operating the vehicle.

The present invention is directed toward overcoming one or more of the disadvantages associated with the prior art.

DISCLOSURE OF THE INVENTION

In one aspect of the present invention an electronic control module reads inputs from an engine sensor and a vehicle sensor. The electronic control module preferably includes memory which has stored therein a vehicle speed limit and programmable weighting factors. The electronic controller computes a driver performance score as a function of said sensor signals and said weighting factors, compares the driver performance score to a minimum incentive score, and calculates a modified vehicle speed limit in response to the comparison.

These and other aspects and advantages of the present invention will become apparent upon reading the following written description of the best mode embodiment in connection with the drawings and appended claims.

BRIEF DESCRIPTION OF THE DRAWINGS

FIG. 1 shows a block diagram of an electronic control for a compression ignition engine.

FIG. 2 shows a flow chart for a preferred embodiment of software used in connection with the best mode embodiment of the present invention.

FIGS. 3a–f graphically show exemplary individual engine rating factors used in a preferred embodiment of the present invention.

FIG. 4 graphically shows a calculation of a vehicle speed limit incentive according to a preferred embodiment of the present invention.

BEST MODE FOR CARRYING OUT THE INVENTION

Figure 3E:
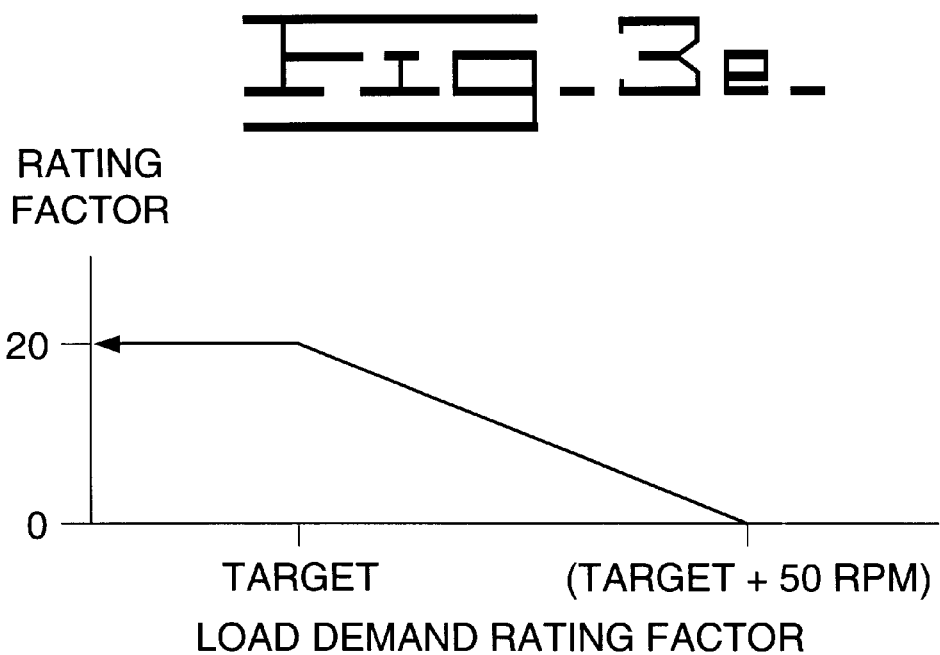

Referring first to FIG. 1, there is shown an electronic control module (ECM) 10 in communication with typical engine componentry 20 and a user-interface 30. As is known to those skilled in the art, the ECM 10 typically includes an electronic controller in the form of a microprocessor having volatile random-access memory (RAM), and nonvolatile read-only memory (ROM). Of course, the ECM 10 could also include other types of memory instead of, or in addition to, RAM and ROM, such as flash EPROM or EEPROM memories, as is well known in the art. Those skilled in the art could readily and easily construct an ECM as described herein. The ROM, or other nonvolatile memory, typically will include software code instruction sets, which are executed to perform various control and information functions, as well as data tables, which contain calibration values and parameters characterizing normal engine operation. Also known to those skilled in the art is that the microprocessor typically will communicate with the engine componentry and other devices outside the ECM through input and output (I/O) drivers. Such I/O drivers protect the controller from hostile electrical impulses while providing the signals and power necessary for engine control. The ECM componentry detailed above is interconnected by data, address and control buses. It should be noted that there are a variety of other possible control schemes which include various combinations of microprocessors and electric or electronic circuits which could perform the same function.

With continuing reference to FIG. 1, engine componentry 20 typically includes a plurality of fuel injectors 35, which may include electronic unit injectors 40, each associated with a particular engine cylinder; and a plurality of sensors 50 for indicating various engine operating conditions, such as coolant temperature, air temperature, oil temperature, fuel temperature, intercooler temperature, throttle position, intake manifold pressure, fuel pressure, oil pressure, coolant pressure, cylinder position, and cylinder sequencing to name a few. Engine componentry 20 also includes actuators 60 which may include solenoids, variable valves, indicator lights, motors, and/or generators, among others. As shown in FIG. 1, the components such as the EUI injectors 40, engine sensors 50, actuators 60, and vehicle sensors 55, are connected to the ECM 10 through a databus 15 or other suitable means for connecting and communicating with several components periodically. It should be appreciated that the ECM 10 may also be in communication with other vehicle componentry and microprocessors which control associated vehicle systems, such as the brakes, the clutch, the transmission, a vehicle management system or a fleet management transponder. The vehicle sensor block 60 incorporates these typical vehicle and other sensors.

The user-interface 30 typically is used to permit a fleet manager, owner, or other authorized user to input and store user selected parameters, and to view or otherwise monitor values for those parameters. For example, a fleet manager may be permitted to input a specific parameter that determines the maximum vehicle speed that the vehicle is permitted to travel, or maximum idle times, among others. In one aspect of the present invention, the manager may be permitted to input a parameter or parameters to activate the present invention. The storing of selected engine operating parameters may produce engine historical information including diagnostic information used to assist personnel performing routine maintenance or troubleshooting malfunctions, as well as engine and vehicle operation data, which may be analyzed to evaluate vehicle operator performance in addition to vehicle performance. It should be appreciated that although FIG. 1 illustrates the user-interface as being external to the ECM 10, certain operations performed by the user-interface could, of course, also be performed by the ECM 10.

Referring now to FIG. 2, a generic flowchart of a preferred embodiment of the software used in connection with the best mode embodiment of the invention is shown. The generic flowchart depicts the control strategy employed in software which can be readily and easily implemented using the instruction set for any suitable microprocessor. In a preferred embodiment, the ECM 10 includes a model 68HC11microprocessor manufactured by Motorola, Inc., located in Schaumburg, Ill., although any suitable microprocessor may be utilized in practicing an embodiment of the present invention. The process of writing software from a generic flowchart such as the one shown in FIG. 2 is a mechanical step for one skilled in the art of programming.

Software control begins in block 200, and passes to block 210. In block 210, the microprocessor inputs values from appropriate engine sensors 50 and vehicle sensors 55. As is described more completely below, the microprocessor preferably inputs a variety of values including the engine speed, the throttle pedal position, the clutch pedal position, and the transmission speed, among others. Program control then passes to block 220.

In block 220, the microprocessor calculates a driver performance score ("DPS") based on the various sensor inputs from block 210. Program control then passes to block 230.

In block 230, the microprocessor checks the DPS against a minimum incentive score. If the DPS is greater than the minimum incentive score, then program control passes to block 250. In block 250, the ECM 10 calculates a vehicle speed limit incentive. Program control then passes to block 260. In block 260, the modified vehicle speed limit (VSL') is set equal to the VSL plus the calculated vehicle speed limit incentive. Program control then passes to block 270.

If, on the other hand, in block 230 the DPS is not greater than the minimum incentive score, then program control passes from block 230 to block 240. In block 240, the modified vehicle speed limit (VSL') is set to the programmed vehicle speed limit (VSL'). Program control then passes to block 270.

In block 270, the ECM 10 controls fuel delivery to the engine to limit power generated by the engine when the vehicle speed exceeds the modified vehicle speed limit VSL'. Program control then returns to block 210.

Referring now to FIGS. 3a–3f, the graphs show exemplary rating factors used in a preferred embodiment of the present invention. These driver performance rating factors are computed using one or more inputs from the vehicle sensors 55 and the engine sensors 50. By using a combination of different rating factors, the end user may emphasize different driving characteristics that are to be encouraged. As described more fully below, in a preferred embodiment, the driver performance factors shown in FIGS. 3a–3f can be weighted and combined to customize the computation of the overall driver performance score.

Referring first to FIG. 3a, an exemplary graph of an engine speed rating factor is shown. In the graph, a target value is shown on the independent axis. The target value either is a user programmed value that is stored in memory or the user can simply rely on a default value. In a preferred embodiment, the default value is 1500 rpm and the engine controller will preferably begin to monitor this factor and use it in computing a driver performance score when the vehicle begins to move (i.e., when the vehicle is not stationary and idling). The maximum programmable value for the target is top engine limit (TEL). As shown in FIG. 3a, if the actual engine speed, as measured by an engine speed sensor, is less than or equal to the target, then the rating produced for the engine speed rating factor is twenty. As the engine speed increases past the target, the rating produced by this factor linearly decreases to zero at the point where the actual engine speed is equal to the target plus 500 rpm. Although the preferred embodiment uses a linear relationship between the engine speed and the rating factor, other functions such as exponential, piece-wise linear, or a non-linear function stored in table form could be used without deviating from the spirit and scope of the present invention as defined by the appended claims.

Referring now to FIG. 3b an exemplary graph of the vehicle speed rating factor is shown. In the graph, a target vehicle speed is shown on the independent axis. The target vehicle speed is a programmable value with a minimum value of fifteen MPH and a maximum value equal to the vehicle speed limit (VSL). The target value is either a user programmed value stored in memory or the user can simply rely on a default value, which in a preferred embodiment is 55 MPH. As shown in FIG. 3b, if the actual vehicle speed (in a preferred embodiment the vehicle speed is calculated from a transmission output speed signal, as is well known in the art) is less than or equal to the target vehicle speed, then the rating produced for the engine speed rating factor is twenty. As the actual vehicle speed increases past the target, the rating produced by this factor linearly decreases to zero at the point where the actual vehicle speed is equal to the VSL. Although the preferred embodiment uses a linear relationship between the actual vehicle speed and the rating factor, other types of functions, such as exponential, piecewise linear, or a non-linear function stored in table form could be used without deviating from the spirit and scope of the present invention as defined by the appended claims.

Referring now to FIG. 3c, an exemplary embodiment of shifting techniques rating factor is shown. This factor produces a rating that is a function of the engine speed at the time an upshift is initiated. In a preferred embodiment, the controller measures only those upshifts that occur after the vehicle has begun to move and the vehicle speed is more than two miles per hour (i.e., is not stationary and idling). This factor preferably only measures the engine speed when the vehicle operator initiates an upshift and does not measure the engine speed for a downshift. As is known to those skilled in the art, the ECM 10 can determine when an upshift occurs by computing the ratio of the engine speed to the transmission output speed. As show in FIG. 3c, a target engine speed for upshifting is shown on the independent axis. The target value is a programmable value that is stored in memory, or the user can simply rely on a default value. In a preferred embodiment, the default value depends on the specific engine model. However, in a 3400 series engine manufactured by Caterpillar Inc., the assignee of this patent, the default is preferably 1500 rpm, but can be programmed anywhere between 1000 RPM and the TEL. As shown in FIG. 3c, if the actual engine speed when the upshift occurs, is less than or equal to the target when the driver initiates an upshift, then the rating produced for the shifting techniques rating factor is twenty. As the engine speed at the time of the upshift increases past the target, the rating produced by this factor linearly decreases to zero at the point where the actual engine speed at the time of the upshift is equal to the TEL. Although the preferred embodiment uses a linear relationship between the upshift engine speed and the rating factor, other functions such as exponential, piece-wise linear, or a non-linear function stored in table form could be used without deviating from the spirit and scope of the present invention as defined by the appended claims.

Referring now to FIG. 3d, an exemplary calculation of a load demand is shown. As shown in the graph, in a preferred embodiment of the present invention the electronic controller monitors the actual engine speed 310 and the desired engine speed 320 (as determined by the throttle pedal position or other known means) and determines a load demand rating by integrating the difference between the desired engine speed and the actual engine speed during those times when the operator is demanding increased power output from the engine, i.e. those times when the desired engine speed exceeds the actual engine speed. This factor depends, to some extent, on the aggressiveness of the driver with the throttle pedal and because the integration intervals selected in the programming are sufficiently small, it approximates the instantaneous difference between engine speed demanded by the operator through the throttle pedal and actual engine speed. For example, if the driver routinely slams the throttle pedal to the floor when starting from a stop or when otherwise trying to accelerate, the desired engine speed will greatly exceed the actual engine speed. The result of this integration will be a large number which is then used in conjunction with the graph shown in FIG. 3e to calculate the load demand rating. Because the value of the load demand will be dependent, to some extent, on the integration interval selected, it is preferable to normalize the load demand value to make the measurement independent of the integration interval. In a preferred embodiment the integration interval is approximately one second.

Referring now to FIG. 3e, an exemplary embodiment of the load demand rating factor is shown. Once the electronic controller has calculated the normalized load demand, that value is compared to a target value. In a preferred embodiment the target value is programmable and can have a value between zero RPM and 1000 RPM, with a default value of 10 RPM. For example, if the target value is 10 rpm, then when the normalized load rating is less than or equal to 10 rpm the load demand rating factor will be twenty and will linearly decrease to zero when the normalized load demand is equal to the target value +50 rpm. Although the preferred embodiment uses a linear relationship between the normalized load demand and the rating factor, other functions could be readily and easily used, such as exponential, piece-wise linear, or a non-linear function stored in a table form, among others, without deviating from the scope of the present invention as defined by the appended claims.

Figure 3F:
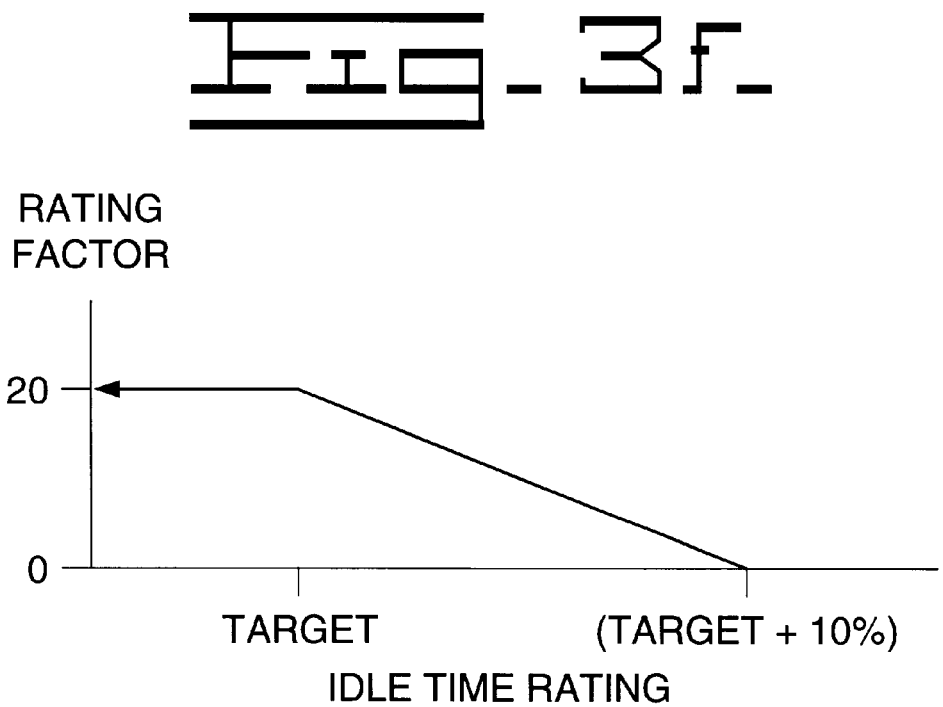

Referring now to FIG. 3f, an exemplary graph of the idle time rating factor is shown. The ECM 10 first determines that the vehicle is idling by reading the outputs of various sensors and then measures the length of time that the vehicle operator spends idling. In a preferred embodiment, the ECM 10 reads a signal from the transmission output sensor to determine that the truck is not moving and monitors the ECM 10 output signals to the EUI injectors 40 to determine that the quantity of fuel delivered to the engine is below a predetermined value thereby indicating that the vehicle is parked and idling. In the graph of FIG. 3f, idle time is shown on the independent axis. The idle time is measured as a percentage of the overall time engine is in operation. The idle time is then compared to target idle time value which is programmable between a minimum value of zero percent and a maximum of one hundred percent. In a preferred embodiment, the default idle time target value is zero percent. As shown in the figure, if the idle time is less than or equal to the target idle time, then the rating produced for the idle time rating factor is twenty. As the idle time increase beyond the target, the rating produced by this factor linearly decreases to zero at the point where the idle time is equal to the target plus ten percent. Although the preferred embodiment uses a linear reduction in the rating factor, other types of reductions, such as exponential, piece-wise linear, or a non-linear function stored in table form could be used without deviating from the spirit and scope of the present invention as defined by the appended claims.

As described above, in a preferred embodiment there are five rating factors. Each of these factors can be weighted to encourage different driver behavior. In a preferred embodiment, the weighting of these factors is calculated as follows:

$$DPS = W_1 R_1 + W_2 R_2 + W_3 R_3 + W_4 R_4 + W_5 R_5 \qquad (EQN\ 1.)$$

Where
$W_1$=Weighting for the Engine Speed Rating;
$W_2$=Weighting for the Vehicle Speed Rating Factor;
$W_3$=Weighting for the Shifting Techniques Rating Factor;

$W_4$=Weighting for the Load Demand Rating Factor;
$W_5$=Weighting factor for the Idle Time Rating Factor;
$R_1$=Engine Speed Rating Factor;
$R_2$=Vehicle Speed Rating Factor;
$R_3$=Shifting Techniques Rating Factor;
$R_4$=Load Demand Rating Factor;
$R_5$=Idle Time Rating Factor; and $$W_1+W_2+W_3+W_4+W_5=1.$$

As shown in the above equations, the sum of the weightings must equal one. However, the vehicle owner can program one weighting factor to be larger than another and therefore increase the impact that factor will have on the calculation of the driver performance score. Thus, if a fleet owner wants to minimize the amount of idle time, without considering any of the other factors, he could program the idle time factor to be one and each of the remaining factors zero.

In a preferred embodiment, the driver performance score is computed at regular intervals and averaged with all prior computed scores within a pre-determined averaging period. For example, in a certain application, the preferred computation interval may be 1.2 seconds and the pre-determined averaging period may be one hour. In that case, the ECM 10 will calculate a new driving score every 1.2 seconds and average that score with all others computed within the last hour. In a preferred embodiment, the computation interval is fixed and cannot be changed by the vehicle owner. However, the pre-determined averaging period preferably is selectable within a minimum value of one hour and a maximum value of one hundred hours.

In a preferred embodiment, the Incentive Evaluation Period is the length of time between successive comparisons of the Driver Performance Score to the Target to determining whether the driver will be rewarded with a modified vehicle speed limit (VSL'). The modified vehicle speed limit is then active for the remainder of the Evaluation Period. A new driver score is calculated at the beginning of the Evaluation Period, preferably according to the following formula:

$$\text{New Driver Score} = \frac{[(\text{Predetermined Averaging Period} - 1)\text{Old Driver Score}]}{\text{Predetermined Averaging Period}} + \frac{\text{Driver Score During Averaging Period}}{\text{Predetermined Averaging Period}} \quad (\text{EQN. 2})$$

Then, the new Driver Performance Score is compared to a Minimum Incentive Score 410, as shown in FIG. 4. Referring to FIG. 4, an exemplary graph of the calculation of the Vehicle Speed Limit Incentive is shown. As shown in the drawing, if the new Driver Performance Score is greater than the Minimum Incentive Score 410, then the ECM 10 provides the corresponding incentive according to line 420. If, however, the Driver Score is less than the Minimum Incentive Score 410, then the calculated incentive is zero. As is described above more fully with reference to FIG. 2, the modified vehicle speed limit (VSL') is then preferably calculated by adding the Vehicle Speed Limit Incentive to the vehicle speed limit (VSL).

In a preferred embodiment, the vehicle owner can program the values of the minimum and maximum vehicle speed limit incentives. Typically, it would be advantageous to program the minimum incentive value to be at least two miles per hour so that the vehicle operator will noticeably feel the incentive when it is provided.

Industrial Applicability

The present invention allows a fleet manager or vehicle owner to make certain programming changes to the ECM 10 of the engine to provide the vehicle operator an incentive to drive in a particular manner. In particular the fleet owner can controllably increase the maximum speed at which he will permit the driver to operate in return for the driver operating in the desired manner. In this way, the vehicle owner can attempt to cause the driver to operate the vehicle in a manner that reduces the maintenance requirements of the vehicle and also reduces the overall operating expenses.

We claim:

1. An electronic engine control for use with a compression ignition engine for on-highway vehicles, said engine control comprising:

an electronic control module;
   a plurality of sensors associated with said engine, said sensors producing signals indicative of operating states of said engine, said engine sensors connected to said electronic control module;
   a plurality of vehicle sensors producing vehicle signals indicative of operating states of said vehicle, said vehicle sensors connected to said electronic control module;
   wherein said electronic control module calculates a rating factor associated with each of said sensor signals and said vehicle sensor signals;
   weighting factors associated with each of said plurality of rating factors;
   a vehicle speed limit;
   wherein said electronic controller calculates a driver performance score as a function of said rating factors and associated weighting factors, compares said driver performance score to a minimum incentive score, calculates a vehicle speed limit incentive and a modified vehicle speed limit.

2. An electronic engine control according to claim 1, wherein said weighting factors are programmable values between a predetermined minimum and a predetermined maximum.

3. An electronic engine control according to claim 1, wherein said sensors include an engine speed sensor and a throttle position sensor, and said electronic control module calculates a load demand rating.

4. A method of controlling a compression ignition engine for use in on-highway vehicles, said method comprising:
   computing a driver performance score;
   comparing said driver performance score to a minimum incentive score;
   calculating a modified vehicle speed limit in response to said step of comparing.

5. The method according to claim 4, wherein computing a driver performance score includes:
   reading an signal produced by a sensor associated with said engine;
   computing a first rating factor based on said step of reading;
   reading a first weighting factor associated with said signal; and calculating a first weighted rating factor from said first rating factor and said first weighting factor.

6. The method according to claim 5, wherein said step of computing a driver score includes:

reading a vehicle sensor signal;

computing a second rating factor based on said step of reading said vehicle sensor;

reading a second weighting factor;

calculating a second weighted rating factor from said second rating factor and said second weighting factor; and summing said first and second weighted rating factors.

* * * * *